(12) United States Patent
Dones et al.

(10) Patent No.: US 6,316,517 B1
(45) Date of Patent: Nov. 13, 2001

(54) RADIATION-POLYMERIZABLE COMPOSITION, FLUSHING AND GRINDING VEHICLE CONTAINING SAME

(75) Inventors: Miguel A. Dones, Hatfield; Ramesh L. Narayan, Horsham, both of PA (US)

(73) Assignee: Cognis Corporation, Gulph Mills, PA (US)

( * ) Notice: Subject to any disclaimer, the term of this patent is extended or adjusted under 35 U.S.C. 154(b) by 0 days.

(21) Appl. No.: 09/378,437

(22) Filed: Aug. 20, 1999

(51) Int. Cl.$^7$ ........................................... C08J 3/28
(52) U.S. Cl. .................. 522/143; 522/144; 522/146; 525/454; 525/531
(58) Field of Search ........................ 522/143, 144; 522/146; 525/531, 454

(56) References Cited

U.S. PATENT DOCUMENTS

| | | |
|---|---|---|
| 3,952,032 | 4/1976 | Vrancken et al. . |
| 4,082,710 | 4/1978 | Vracken et al. . |
| 4,553,940 | 11/1985 | Koblitz et al. . |
| 4,771,085 | 9/1988 | Lazaridis . |
| 5,254,611 | 10/1993 | McDermott . |
| 5,416,173 | 5/1995 | Gagliani et al. . |
| 5,420,229 | 5/1995 | Burke et al. . |
| 5,820,667 | 10/1998 | Lu et al. . |
| 5,889,076 | 3/1999 | Dones et al. . |
| 5,912,381 | 6/1999 | Narayan et al. . |

OTHER PUBLICATIONS

Henkel Corporation, Photomer ® Energy Curing Chemicals Product Description, 1997.

*Primary Examiner*—Edward J. Cain
(74) *Attorney, Agent, or Firm*—John E. Drach; Peter DeLuca; Glenn D. Smith

(57) ABSTRACT

Radiation-polymerizable compositions are especially useful as or in a flush vehicle for making flushed pigments. The compositions contain at least one radiation-curable acrzylated resin component and a copolymerizable rheology modifier component.

29 Claims, No Drawings

RADIATION-POLYMERIZABLE COMPOSITION, FLUSHING AND GRINDING VEHICLE CONTAINING SAME

BACKGROUND

1. Technical Field

Radiation-polymerizable compositions are especially useful as or in a flush vehicle for making flushed pigments. The compositions contain at least one radiation-curable acrylated resin component and a copolymerizable rheology modifier component.

2. Background of Related Art

Pigments are insoluble, fine particle size materials used in a number of applications including ink formulations, coatings, paints and the like to provide color, to hide substrates, to modify the performance properties of coatings and films. In general, most letterpress and lithographic inks are manufactured using dispersed pigment concentrates in a nonaqueous medium.

Pigments are generally produced in an aqueous medium. One of the steps in the manufacture of pigments is precipitation from water. After precipitating the pigment, the pigment/water mixture is filtered to provide a filter cake or presscake containing pigment and moisture. When the pigment is to be incorporated in an organic or non-aqueous system for application to a substrate, it is necessary to remove the residual moisture from the filter cake or presscake. The presscake typically contains 30 to 80% by weight water. Removal of residual water from a presscake is generally accomplished by a process of water displacement known in the art as "flushing."

Generally speaking, flushing is the direct transfer of pigments in an aqueous phase to an oil or nonaqueous phase without intermediate drying. The process for preparing flushed pigments involves the addition of a flushing vehicle, such as an oil or a solution of resins and other additives in an oil or organic solvent, to a presscake. The direct transfer or "flushing" of the pigment particles from the aqueous phase to the oil or non-polar phase is effected by kneading the presscake and vehicle together in a "flusher" or high-shear mixer under heat and vacuum. As the pigment is wet by the flushing vehicle, the water is driven out of the presscake until only a small percentage of water remains. The water that is driven out is removed by standard methods such as decanting. The last traces of water are removed by applying a subatmospheric pressure and/or heat to the presscake. The flushing vehicle in effect "flushes" the water from the pigment resulting in a pigment dispersion in the flushing vehicle. Alkyd resins are sometimes used in addition to the flushing vehicle to assist in the breakout of water from the presscake. Pigments at the presscake stage of manufacture have a particle size which is more suitable for maximum ink gloss and color strength in lithographic ink formulations than pigments in their finished dry form. Accordingly, flushed pigments produced without first drying the pigment are preferred colorants for lithographic ink formulations. When used as a lithographic ink, the flushed pigment normally contains from about 20 to about 70% by weight ink pigment and from about 30 to about 80% by weight flushing vehicle.

A radiation curable grinding vehicle is an admixture of one or more radiation curable oligomers and reactive diluents. The vehicle is used with either a presscake to obtain a UV flush, or with dry pigments on a three roll grinding mill to obtain a lithographic ink.

A flushing vehicle for lithographic ink should exhibit excellent pigment wetting properties when mixed with the highly aqueous presscake during flushing. These pigment wetting properties provide rapid and thorough coverage of the pigment particles and concurrent displacement of water originally bound to or trapped in the particle aggregates. A flushing vehicle with good wetting properties adheres strongly to primary particle units and coats them to provide a steric barrier to reaggregation. The resulting dispersed pigment concentrate exhibits improved color strength, gloss and transparency, as well as reduced bronzing. Representative examples of conventional commercial flushing vehicles used in producing lithographic inks include soluble dibasic acid modified rosin esters, rosin modified phenolic esters, hydrocarbon resins and various specialty alkyds. A flushing vehicle for lithographic inks should generally be stable in storage with respect to viscosity, color and solubility. The prior art compositions used as a flushing vehicle provide inconsistent results. Because of the varying hydrophobic/ hydrophillic characteristics of each pigment, it is not unusual to have variability in the time required to remove 100% of the water present in the presscake. For a review of organic pigments and pigment dispersion processes, see U.S. Pat. Nos. 5,420,229 and 5,820,667 and Kirk Othmer's "Concise Encyclopedia of Chemical Technology"; John Wiley & Sons, 1985, pages 869–892, the contents of all three of which are incorporated herein by reference.

The three main technologies being practiced today which make the bulk of the paints, coatings, inks and adhesive industries are solvent borne, water borne and zero volatile organic compounds (VOC). The main film forming process is either drying (evaporation of a solvent from polymer solution) or curing (two or more components reacting to form a thermosetting polymer). While the water borne systems are generally perceived to be more environmentally friendly and acceptable from a waste and pollution standpoint, both solvent and water-based systems are energy intensive, requiring drying ovens to remove the solvent or water. For several years there has been a technological push to eliminate solvents and water, i.e., to develop water less zero VOC systems. Energy curing is one technology which has been investigated with this objective in mind. In an energy curable system, a relatively fluid formulation is instantly converted to a cross-linked polymer when exposed to energy from a visible or ultraviolet (UV) light source or an electron beam (EB). This technology reduces waste and requires less overall energy consumption. In many cases it vastly improves production speeds and produces properties such as high gloss and excellent abrasion resistance. Hence, energy curing is the technology of choice for many applications such as coatings for wood furniture, floor tiles, magazine covers, CD labels and jackets, high gloss optical fibers, electronic encapsulants and stereolithography. Therefore, a radiation-polymerizable composition useful as a flushing vehicle would be very desirable. UV or EB curing can be accomplished by free radical, cationic, anionic, or charge transfer mechanisms.

U.S. Pat. Nos. 3,952,032 and 4,082,710, both of which are incorporated herein by reference, disclose the use of compounds with multiple acrylic radicals as photopolymerizable binders in ultraviolet curable inks and coatings. Other components of the ink composition disclosed in these patents include inert polymers and plasticizers, pigments and inorganic fillers, photoinitiators and various other conventional additives for inks.

SUMMARY

A radiation-polymerizable composition useful as a flushing vehicle for a variety of lithographic inks has been discovered which comprises a substantially homogenous admixture of:

a) a mixture of two or more radiation-curable acrylated resins selected from the group comprising acrylated epoxies, acrylated urethanes and acrylated polyesters: and b) a rheology modifying resin copolymerizable with radiation-curable acrylate resin when subjected to radiation. The rheology modifying resin is preferably the reaction product of an epoxy component, a first acid component and a second acid component. The first acid component can be an ethylenically unsaturated carboxylic acid or reactive derivative thereof and the second acid component can be a fatty acid or reactive derivative thereof reacted in the presence of a polyamide based on a polymerized fatty acid.

Also described herein are methods for preparing a flushing vehicle. In a particularly useful embodiment, the method includes the steps of (a) reacting an epoxy component and an ethylenically unsaturated carboxylic acid or reactive derivative thereof and a fatty acid or reactive derivative thereof in the presence of a polyamide based on a polymerized fatty acid and (b) adding to the reaction mixture the at least one radiation-curable acrylated resin selected from the group comprising acrylated epoxy oligomers, acrylated aromatic urethane oligomers and acrylated polyesters based on modified fatty acids.

Methods of flushing a presscake containing pigment are also described. These methods include the steps of contacting a presscake containing pigment and moisture with a composition containing (a) the reaction product formed by reacting an epoxy component and an ethylenically unsaturated carboxylic acid or reactive derivative thereof and a fatty acid or reactive derivative thereof in the presence of a polyamide based on a polymerized fatty acid and (b) adding to the reaction mixture at least one radiation-curable acrylated resin selected from the group comprising acrylated epoxies, acrylated urethanes and acrylated polyesters.

The expression "radiation-polymerizable" shall be understood herein to include polymerizing as well as curing reactions occurring in the resinous composition as the latter is exposed to a radiant energy source.

The expression "substantially free from moisture" shall be understood herein to mean that the flushed pigment contains less than 5% by weight of water.

The expression "modified fatty acid" shall be understood herein to mean polymerized fatty acids, e.g., dimer and trimer acids, of $C_{18}$ polyunsaturated monocarboxylic acid.

DETAILED DESCRIPTION OF THE PREFERRED EMBODIMENTS

The compositions herein are useful as flushing vehicles for presscakes containing pigment and moisture and include at least one radiation-polymerizable vehicle which imparts basic mechanical properties and serves as a binder, and at least one rheology modifying (RM) resin. In particularly useful embodiments, the compositions include a mixture of two or more radiation polymerizable resins and a rheology modifier. Other ingredients optionally include reactive diluents, photoinitiators, wetting agents, flow and leveling agents, adhesion promoters, fillers and coloring matter such as any of the pigments or dyes currently used in inks or paints.

While the compositions described herein are particularly applicable to radiation-curable flushing vehicles for making flushed pigments for use in lithographic inks, it should be understood that the compositions can be used in any coating material, with or without pigmentation, for printing or non printing applications. Percentages of materials are by weight unless stated otherwise. Note that all quantities appearing hereinafter shall be understood to be modified by the term "about" except in the Examples and unless indicated otherwise.

The polymerizable vehicle is preferably a radiation-curable acrylate resin or mixture of two or more of such resins. Examples of suitable resins include acrylated epoxies, acrylated urethanes and acrylated polyesters.

The preferred acrylated epoxies are the reaction product of an epoxy resin having two epoxy groups per molecule and acrylic or methacrylic acid. The reaction product will contain an epoxy (meth)acrylate compound having a main chain of polyepoxide and both terminals of a (meth)acrylate group, respectively. Accordingly, the stoichiometric amount of acrylic acid to form a diacrylate adduct would be two moles of acid for each two epoxy groups. In practice, however, it is preferred to use an amount of acid slightly in excess of the amount necessary to cover both epoxy groups. Therefore, the amount of acrylic acid reacted is typically between 2.001 moles to 2.1 moles, and more typically between 2.01 and 2.05 moles of acid per two epoxy groups. U.S. Pat. No. 5,889,076, incorporated herein by reference, provides a more detailed explanation of the synthesis of acrylated epoxies. Useful acrylated epoxies include acrylated epoxy soya oil, acrylated epoxy linseed oil and bisphenol A epoxy diacrylate commercially available as the PHOTOMER® 3000 series available from Henkel Corp., Ambler, Pa. The generic structure of an acrylated epoxy oil is represented by the following formula:

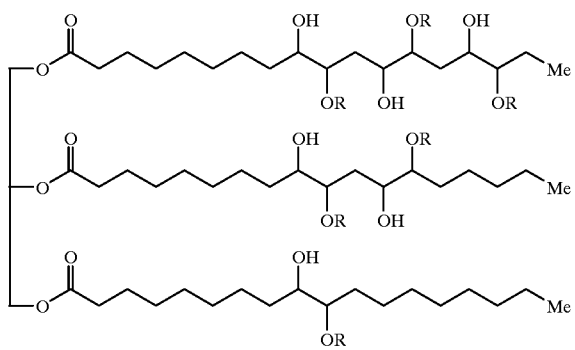

wherein R is equal to O—C(O)—CH:CH$_2$

The preferred acrylated urethanes can be represented by the following formula:

wherein R is alkyl or aryl; R' is a linear aliphatic, cycloaliphatic, (bis)cycloaliphatic or aromatic moiety; R" is $C_1$ to $C_{10}$ alkyl, macro polyester or polyether, the molecular weight of which is generally from 300 to 3000; X is H or alkyl COOH; Y is NH or O; m, n, t and q are positive integers; and p is zero or a positive integer. U.S. Pat. No. 5,254,611, the contents of which are incorporated herein by reference, provides a more detailed explanation of the synthesis of acrylated urethanes. Useful acrylated urethanes include both aromatic and aliphatic acrylated urethane oligomers such as aromatic urethane hexa acrylate, aromatic urethane diacrylate, aliphatic urethane diacrylate, and aliphatic urethane triacrylate. Such acrylated urethanes are commercially available as the PHOTOMER® 6000 series of urethane acrylates available from Henkel Corp., Ambler, Pa.

The acrylated polyester compound is the condensation reaction product of (a) a fatty acid, (b) an α-β ethylenically unsaturated acid or derivative thereof and (c) a polyoxyalkylene polyol. That is, the acrylated polyester is an ester of the polyol, a polycarboxylic acid and acrylic or methacrylic acid such that the combined equivalent of the acid is equal to that based on the hydroxyl functionality of the polyol. The condensation reaction can be conducted by the reactive mixing of components (a) and (c), and then reacting the reaction product thereof with (b) or optionally by the reactive mixing of components (b) and (c), and then reacting the reaction product thereof with (a) or preferably by the reactive mixing of all components (a), (b) and (c). U.S. Pat. No. 4,180,487, incorporated herein by reference, provides a more detailed description of the synthesis of acrylated polyesters. Such materials are commercially available as the PHOTOMER® 5000 series of polyester acrylates available from Henkel Corp., Ambler, Pa. and have the following general formula.:

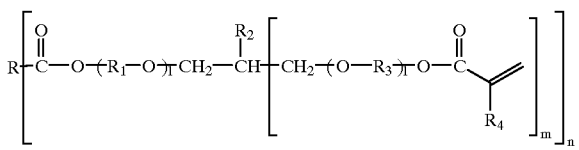

wherein R is an alkyl or cycloalkyl residue of a $C_{18}$–$C_{54}$ polycarboxylic acid, $R_1$ can be the same or different than $R_3$ and is a $C_2$–$C_4$ alkyl, $R_2$ is H or $C_1$–$C_2$ alkyl, $R_4$ is H or methyl, 1 is an integer from 1–10, m is 2 and n is an integer from 2–3.

The rheology modifying resins ("RM resins") are oligomers which are copolymerizable with the vehicle resin and impart enhanced thixotropic properties to the flush composition. That is, such RM resins undergo efficient shear thinning under high shear rates as seen, for example, in lithographic inks on a printing press. The RM resins can be made, for example, by co-reacting a polyamide (e.g., VERSAMID™ 335, available from Henkel Corp.) with an epoxy resin and acrylic acid or a mixture of acids, the mixture including an acrylic acid. Typical characteristics of useful RM resins available from Henkel Corp. under the designations RCC™ 13-444, RCC™ 13-445 and RCC™ 13-370 are set forth below in Table 1:

TABLE 1

| RM Resin | Color (Gardner) | Acid Value (mg KOH/g) | Viscosity (poise, 60° C.) | Functionality Theoretical | Appearance |
|---|---|---|---|---|---|
| RCC ™ 13-444 | 5 | 5 | 250–450 | 2 | yellow paste |
| RCC ™ 13-445 | 4 | 5 | 400–600 | 2 | pale yellow paste |
| RCC ™ 13-370 | 7 | 5 | 500–700 | 2 | yellow paste |

The RM resins listed above comprise the reaction product of a diepoxide and an acid component which includes an ethylenically unsaturated carboxylic acid or reactive derivative thereof reacted in the presence of a polyamide derived from a polymerized fatty acid. The polyamide typically has a number average molecular weight of less than 10,000 g/mole.

Useful epoxies are the glycidyl ethers of both polyhydric phenols and polyhydric alcohols, epoxidized fatty acids or drying oil acids, epoxidized diolefins, epoxidized di-unsaturated acid esters, as well as epoxidized unsaturated polyesters, preferably containing an average of more than one epoxide group per molecule. Depending upon whether the epoxy resin is substantially monomeric or polymerized to some degree, the preferred epoxy compounds will have a molecular weight of from 300 to 600 and an epoxy equivalent weight of between 150 and 1,200.

Representative examples of the epoxides include condensation products of polyphenols and epichlorohydrin. For the polyphenols, there may be listed bisphenol A, 2,2'-bis(4-hydroxyphenyl)methane (bisphenol F), halogenated bisphenol A, resorcinol, tetrahydroxyphenylethane, phenol novolac, cresol novolac, bisphenol A novolac and bisphenol F novolac. There may also be listed epoxy compounds of the alcohol ether type obtainable from polyols such as alkylene glycols and polyalkylene glycols, e.g., ethylene glycol, 1,2-propylene glycol, 1,3-propylene glycol, 1,4-butanediol, 1,6-hexanediol, neopentyl glycol, glycerine, polyethylene glycol, polypropylene glycol, polytetrahydrofuran, (i.e., poly(1,4-butanediol), which is obtainable under the designation TERATHANE® from DuPont), and alkylene oxide-adduct of bisphenols, and epichlorohydrin; glycidyl amines obtainable from anilines such as diaminodiphenylmethane, diaminophenylsulfone and p-aminophenol, and epichlorohydrin; glycidyl esters based on acid anhydrides such as phthalic anhydride and tetrahydro- or hexahydro-phthalic anhydride; and alicyclic epoxides such as 3,4-epoxy-6-methylcyclohexylmethyl and 3,4-epoxy-6-methylcyclohexyl carboxylate.

Glycidyl polyethers of polyhydric phenols are made from the reaction of a 0 polyhydric phenol with epihalohydrin or glycerol dihalohydrin, and a sufficient amount of caustic alkali to combine with the halogen of the halohydrin. Glycidyl ethers of polyhydric alcohols are made by reacting at least about 2 moles of an epihalohydrin with 1 mole of a polyhydric alcohol such as ethylene glycol, pentaerythritol, etc., followed by dehydrohalogenation.

In addition to polyepoxides made from alcohols or phenols and an epihalohydrin, polyepoxides made by the known peracid methods are also suitable. Epoxides of unsaturated esters, polyesters, diolefins and the like can be prepared by reacting the unsaturated compound with a peracid. Preparation of polyepoxides by the peracid method is described in various periodicals and patents and such compounds as butadiene, ethyl linoleate, as well as di- or tri-unsaturated drying oils or drying oil acids, esters and polyesters can all be converted to polyepoxides. Epoxidized drying oils are also well known, these polyepoxides usually being prepared by reaction of a peracid such as peracetic acid or performic acid with the unsaturated drying oil according to U.S. Pat. No. 2,569,502 the contents of which are incorporated herein by reference.

In certain embodiments, the diepoxide is an epoxidized triglyceride containing unsaturated fatty acids. The epoxidized triglyceride may be produced by epoxidation of one or more triglycerides of vegetable or animal origin. The only requirement is that a substantial percentage of diepoxide compounds should be present. The starting materials may also contain saturated components. However, epoxides of fatty acid glycerol esters having an iodine value of 50 to 150 and preferably 85 to 115 are normally used. For example, epoxidized triglycerides containing 2% to 10.5% by weight of epoxide oxygen are suitable. This epoxide oxygen content can be established by using triglycerides with a relatively low iodine value as the starting material and thoroughly epoxidizing them or by using triglycerides with a high iodine value as starting material and only partly reacting them to epoxides. Products such as these can be produced from the following fats and oils (listed according to the ranking of their starting iodine value): beef tallow, palm oil, lard, castor oil, peanut oil, rapeseed oil and, preferably, cottonseed oil, soybean oil, train oil, sunflower oil, linseed oil. Examples of typical epoxidized oils are epoxidized soybean oil with an epoxide value of 5.8 to 6.5, epoxidized sunflower oil with an epoxide value of 5.6 to 6.6, epoxidized linseed oil with an epoxide value of 8.2 to 8.6 and epoxidized train oil with an epoxide value of 6.3 to 6.7.

Further examples of polyepoxides include the diglycidyl ether of diethylene glycol or dipropylene glycol, the diglycidyl ether of polypropylene glycols having molecular weight up to, for example, 2,000, the triglycidyl ether of glycerine, the diglycidyl ether of resorcinol, the diglycidyl ether of 4,4'-isopropylidene diphenol, epoxy novolacs, such as the condensation product of 4,4'-methylenediphenol and epichlorohydrin and the condensation of 4,4'-isopropylidenediphenol and epichlorohydrin, glycidyl ethers of cashew nut oil, epoxidized soybean oil, epoxidized unsaturated polyesters, vinyl cyclohexene dioxide, dicyclopentadiene dioxide, dipentene dioxide, epoxidized polybutadiene and epoxidized aldehyde condensates such as 3,4-epoxycyclohexyl methyl-3',4'-epoxycyclohexane carboxylate.

Particularly preferred epoxies are the glycidyl ethers of bisphenols, a class of compounds which are constituted by a pair of phenolic groups interlinked through an intervening aliphatic bridge. While any of the bisphenols may be used, the compound 2,2-bis (p-hydroxyphenyl) propane, commonly known as bisphenol A, is more widely available in commerce and is preferred. While polyglycidyl ethers can be used, diglycidyl ethers are preferred. Especially preferred are the liquid bisphenol A-epichlorohydrin condensates with a molecular weight in the range of from 300 to 600.

The acid component is comprised of an ethylenically unsaturated acid. Particularly suitable ethylenically unsaturated monocarboxylic acid are the alpha, beta-unsaturated monobasic acids. Examples of such monocarboxylic acid monomers include acrylic acid, beta-acryloxypropionic acid, methacrylic acid, crotonic acid, and alpha-chloroacrylic acid. Preferred examples are acrylic acid and methacrylic acid. Also suitable acid components are adducts of hydroxyalkyl acrylates or hydroxyalkyl methacrylates and the anhydrides of dicarboxylic acids such as, for example, phthalic anhydride, succinic anhydride, maleic anhydride, glutaric anhydride, octenylsuccinic anhydride, dodecenylsuccinic anhydride, chlorendic anhydride, tetrahydrophthalic anhydride, hexahydrophthalic anhydride and methyltetrahydrophthalic anhydride. Such adducts can be prepared by methods of preparative organic chemistry known in the art. The acid component can also contain other carboxylic acids. In certain embodiments, the acid component will be comprised of a minor amount, e.g., less than 50% of the total acid equivalents, more typically less than 20% of the total acid equivalents, of a fatty acid. The fatty acids are saturated and/or unsaturated aliphatic monocarboxylic acids containing 8 to 24 carbon atoms or saturated or unsaturated hydroxycarboxylic acids containing 8 to 24 carbon atoms. The carboxylic acids and/or hydroxycarboxylic acids may be of natural and/or synthetic origin. Examples of suitable monocarboxylic acids are caprylic acid, 2-ethylhexanoic acid, capric acid, lauric acid, myristic acid, palmitic acid, palargonic acid, palmitoleic acid, stearic acid, isostearic acid, oleic acid, elaidic acid, petroselic acid, linoleic acid, linolenic acid, elaeostearic acid, conjuene fatty acid, ricinoleic acid, arachic acid, gadoleic acid, behenic acid, erucic acid and brassidic acid and the technical mixtures thereof obtained, for example, in the pressure hydrolysis of natural fats and oils, in the oxidation of aldehydes from Roelen's oxo synthesis, or as monomer fraction in the dimerization of unsaturated fatty acids. In a particularly preferred embodiment, the fatty acid is derived from technical mixtures of the fatty acids mentioned which are obtainable in the form of the technical mixtures typically encountered in oleochemistry after the pressure hydrolysis of oils and fats of animal or vegetable origin, such as coconut oil, palm kernel oil, sunflower oil, rape oil, rapeseed oil and coriander oil and beef tallow. However, the fatty acid may also contain a branched fatty acid residue, for example the residue of 2-ethyl hexanoic acid, isopalmitic acid or isostearic acid.

Preferred fatty acids are mixtures obtained from natural sources, e.g., palm oil, palm kernel oil, coconut oil, rapeseed oil (from old high-erucic acid plants or from new low-erucic acid plants, a.k.a. canola oil), sunflower oil (from old low-oleic plants or from new high-oleic plants), castor oil, soybean oil, cottonseed oil, peanut oil, olive oil, olive kernel oil, coriander oil, castor oil, meadowfoam oil, chaulmoogra oil, tea seed oil, linseed oil, beef tallow, lard, fish oil and the like. Naturally occurring fatty acids typically are present as triglycerides of mixtures of fatty acids wherein all fatty acids have an even number of carbon atoms and a major portion by weight of the acids have from 12 to 18 carbon atoms and are saturated or mono-, di-, or tri-unsaturated.

The preferred epoxy resins, i.e., those made from bisphenol A, will have two epoxy groups per molecule. Thus, the product of a reaction with acrylic or methacrylic acid will contain an epoxy (meth)acrylate compound having a main chain of polyepoxide and both terminals of a (meth)acrylate group, respectively. Accordingly, the stoichiometric amount of acrylic acid to form a diacrylate adduct would be two moles of acid for each two epoxy groups. In practice, however, it is preferred to use an amount of acid slightly in excess of the amount necessary to cover both epoxy groups. Therefore, the amount of acrylic acid reacted is typically between 2.001 moles to 2.1 moles, and more typically between 2.01 and 2.05 moles of acid per two epoxy groups.

The reaction of the epoxide and the acid takes place in the presence of a polyamide derived from a polymerized fatty acid. The polyamide preferably has a number average molecular weight of less than 10,000 grams/mole. Low melting polyamide resins melting within the approximate range of 90° C. to 130° C. may be prepared from polymeric fatty acids and aliphatic polyamines. Typical of the polyamines which may be used are ethylene diamine, diethylene triamine, triethylene tetramine, tetraethylene pentamine, 1,4-diaminobutane, 1,3-diaminobutane, hexamethylene diamine, piperazine, isophorone diamine, 3-(N-isopropylamine)-propylamine, 3,3'-iminobispropylamine, and the like. A preferred group of these low melting polyamides are derived from polymeric fatty acids, and ethylene diamine and are solid at room temperature.

Suitable such polyamides are commercially available under the trade designation of VERSAMID® polyamide resins, e.g., VERSAMID® 335, 750 and 744, and are amber-colored resins having a number average molecular weight up to 10,000, preferably from 1,000 to 4,000 and a softening point from below room temperature to 190° C.

The preferred polyamide is VERSAMID® 335 polyamide which is commercially available from Henkel Corporation and has an amine value of 3, a number average molecular weight of 1699, as determined by gel permeation chromatography (GPC) using a polystyrene standard, and a polydispersity of 1.90.

The preparation of such VERSAMID® polyamide resins is well known and by varying the acid and/or functionality of the polyamine, a great variety of viscosities, molecular weights and levels of active amino groups spaced along the resin molecule can be obtained. Typically, the VERSA-MID® polyamide resins useful herein have amine values from 0 to 25, preferably 0 to 10, more preferably 0 to 5; viscosities of from about 1 to 30 poises (at 160° C.) and polydispersities of less than 5. The amine value and number average molecular weight of the polyamide can be determined as described in U.S. Pat. No. 4,652,492 (Seiner, et. al.), the disclosure of which is incorporated herein by reference.

The polyamide is incorporated into the composition in an amount not exceeding 50% by weight based on the combined weight of the epoxide and acid components and the polyamide. Preferably, an amount not exceeding 25% by weight is utilized and most preferred is an amount of from 5% to 15% by weight.

The reaction between the epoxide and acid can be performed over a wide range of temperatures, e.g., from 40° C. to 150° C., more typically from 50° C. to 130° C. and preferably between 90° C. and 110° C., at atmospheric, sub-atmospheric or superatmospheric pressure, preferably in an inert atmosphere. Esterification is continued until an acid number of 2 to 15 is obtained. This reaction ordinarily takes place in 8 to 15 hours. To prevent premature or undesirable polymerization of the product or the reactants, it is advantageous to add a vinyl inhibitor to the reaction mixture. Suitable vinyl polymerization inhibitors include tert-butylcatechol, hydroquinone, 2,5-ditertiarybutylhydroquinone, hydroquinonemonoethyl ether, etc. Advantageously, the inhibitor is included in the reaction mixture at a concentration of 0.005 to 1.0% by weight based on the total of the reagents.

The reaction between the epoxide and the acid proceeds slowly when uncatalyzed, and can be accelerated by suitable catalysts which preferably are used, such as, for example, the tertiary bases such as triethylamine, tributylamine, peritonea, dimethyl aniline, this (dimethylaminomethyl)-phenol, triphenyl phosphine, tributyl phosphine, tributyl stilbene; alcoholates such as sodium methylate, sodium butylate, sodium methoxyglycolate, etc.; quaternary compounds such as tetramethylammonium bromide, tetramethylammonium chloride, benzyl-trimethylammonium chloride, and the like. At least 0.1%, based on total weight of reagents, preferably at least 0.5%, of such catalyst is desirable.

The flushing vehicle can be prepared by mixing at least one of the reaction products listed hereinabove with at least one acrylated resin at room temperature. However, this process is lengthy and difficult in preparing a uniform material due to the solid nature of the reaction product listed hereinabove at room temperature. More preferably the RM resin is prepared as the reaction product mixture described hereinabove at the time the flushing vehicle is prepared and then at least one acrylated resin is added to the reaction product mixture to form the flushing vehicle. In a preferred embodiment of the invention, the flushing vehicle will contain from 5 to 30, preferably from 8 to 16 parts by weight of acrylated epoxy oligomer, from 10 to 35, preferably from 20 to 30 parts by weight of acrylated aromatic urethane oligomer, from 10 to 50, preferably from 20 to 30 parts by weight of acrylated polyester based on modified fatty acids, and from 10 to 50, preferably from 15 to 35 parts by weight of acrylated rheology modifying resin.

Typical examples of suitable monomers which can optionally be used and added to the reaction mixture before or during the reaction, or added after the reaction, as a reactive diluent, are the vinyl or vinylidene monomers containing ethylenic unsaturation, and which can copolymerized with the compositions of this invention are, styrene, vinyl toluene, tertiary butyl styrene, alpha-methyl-styrene, monochlorostyrene, dichlorostyrene, divinylbenzene, ethyl vinyl benzene, diisopropenyl benzene, methyl acrylate, ethyl acrylate, methyl methacrylate, ethyl methacrylate, acrylonitrile, methacrylonitrile, the vinyl esters, such as vinyl acetate and the monovinyl esters of saturated and unsaturated aliphatic, monobasic and polybasic acids, such as the vinyl esters of the following acids: propionic, isobutyric, caproic, oleic, stearic, acrylic, methacrylic, crotonic, succinic, maleic, fumaric, itaconic hexahydrobenzoic, citric, tartaric, etc., as well as the corresponding allyl, methallyl, etc., esters of the aforementioned acids, the itaconic acid monoesters and diesters, such as the methyl, ethyl, butyl esters, etc.; the maleic and fiunaric acid monoesters, diesters and their amide and nitrile compounds, such as diethyl maleate, maleyl tetramethyl diamide, fumaryl dinitrile, dimethyl fumarate; cyanuric acid derivatives having at least one copolymerizable unsaturated group attached directly or indirectly to the triazine ring such as diallyl ethyl cyanurate, triallyl cyanurate, etc., ethers such as vinyl allyl ether, divinyl ether, diallyl ether, resorcinol divinyl ether, etc., diallyl chlorendate, diallyl tetrachloro phthalate, diallyl tetrabromophthalate, dibromopropargyl acrylate, as well as the partial fusible or soluble polymerizable polymers of the hereinabove listed monomers, etc.

In preparing the polymerizable compositions of this invention containing the reaction product of this invention, at least one acrylated resin and one or more of the monomers of the type listed hereinabove, the relative amount of the monomers can vary broadly. In general, however, the monomer or monomers are used at less than 50% by weight of the composition, typically in the range of 10% to 30% by weight, and more typically in the range of 15% to 25% by weight.

The new compositions of this invention can be cured or converted to the infusible state, alone or in admixture with other monomers or polymers by exposure to radiation alone or in the presence of radical generating catalysts such as benzoin, benzoin ethers, and Michler's Ketone. The free radical initiator is typically present at from 0.01% to 20% by weight of the radiation curable components. Examples of useful radiation include ultraviolet light and ionizing radiation such as generated by X-Ray machines; electron accelerators such as Van de Graaf machines, traveling wave linear accelerators, particularly of the type described in U.S. Pat. No. 2,736,609, natural and synthetic radioactive material, for example cobalt 60, etc. To ensure that the composition does not prematurely polymerize, a free radical inhibitor may be added to the polymerizable composition. Examples of suitable inhibitors include hydroquinone and the methyl ether thereof or butylated hydroxy toluene at a level of from 5 ppm to 2000 ppm by weight of the polymerizable components. Additives which are particularly useful in prolonging the shelf-life of the composition can also be used, e.g., ultraviolet stabilizers such as Florstab UV-II from Kromachem.

The direct transfer or "flushing" of the pigment particles from the aqueous phase to the oil or non-polar phase is effected by kneading the presscake and flushing vehicle together in a flusher or high-shear mixer under heat and vacuum. As the pigment is wet by the flushing vehicle, the water is driven out of the presscake until only a small percentage of water remains. The water that is driven out is removed by standard methods such as decanting. The last traces of water are removed by applying a subatmospheric pressure and/or heat to the presscake. The flushing vehicle in effect "flushes" the water from the pigment resulting in a pigment dispersion in the flushing vehicle.

The present compositions are useful in the preparation of radiation-curable flushing vehicles and in the preparation of molded, cast, laminated and coated products as adhesives, impregnants and protective coatings. They can be used alone or with fillers, dyes, pigments, opacifiers, lubricants, plasticizers, natural or synthetic resins or other modifying bodies. Preferably the compositions described herein do not contain a significant amount of any additive which is not chemically bondable with the radiation curable acrylated resin(s).

In a method of coating a substrate using the composition disclosed herein, the composition, optionally containing a photoinitiator, is applied to the surface of a substrate and subsequently exposed to a radiation source until an adherent dry polymerized film is formed on the substrate. Sources of radiant energy appropriate for initiating cure of the formulations have been described extensively in the literature and are well known to those skilled in the art. These include various sources of particulate and non particulate radiation producing wavelengths generally less than 700 nanometers. Especially useful is actinic radiation in the 180–440 nm range which can be conveniently obtained by use of one of several commercially available ultraviolet sources specifically intended for this purpose. These include low, medium and high pressure mercury vapor lamps, He-Cd and Ar lasers, xenon arc lamps, etc. Photoinitiator systems having a corresponding sensitivity to light in this wave band are normally incorporated into the formulation and upon irradiation lead to the formation of reactive species capable of initiating free radical polymerization. Similarly, free radical polymerization may be induced by exposure of the formulation to an electron beam without the use of a photoinitiator. Equipment capable of generating a curtain of electrons with energies between 150 and 300 KeV is particularly suitable for this purpose and its use is well documented in the literature.

Particularly preferred sources of radiation emit electromagnetic radiation predominantly in the ultraviolet band. When such a source is used, the curable composition preferably contains a photoinitiator susceptible to ultraviolet radiation, e.g., benzoin, benzoin ethers, α,α-dimethoxy-α-phenylacetophenone, diethoxyacetophenone, a-hydroxy-a, a-dimethylacetophenone, 1-benzoylcyclohexanol, and aryl phosphine oxide-based photoinitiators such as, for example, LUCIRIN™ TPO available from BASF Corp.

The amount of radiation necessary to cure the composition will of course depend on the angle of exposure to the radiation, the thickness of the coating to be applied, and the amount of polymerizable groups in the coating composition, as well as the presence or absence of a free radical initiating catalyst. For any given composition, experimentation to determine the amount of radiation sensitive pi bonds not cured following exposure to the radiation source is the best method of determining the amount and duration of the radiation required. Typically, an ultraviolet source with a wavelength between 200 and 420 nm (e.g., a filtered mercury arc lamp) is directed at coated surfaces carried on a conveyor system which provides a rate of passage past the ultraviolet source appropriate for the radiation absorption profile of the composition (which profile is influenced by the degree of cure desired, the thickness of the coating to be cured, and the rate of polymerization of the composition).

The following examples are given for the purpose of illustrating the present invention. All parts and percentages of composition are by weight unless stated otherwise.

EXAMPLE 1

| components | percent by weight | weight (grams) |
|---|---|---|
| RCC 13-370* | 35.0 | 1750.0 |
| RCC 13-363* | 30.0 | 1500.0 |
| RCC 13-430* | 25.0 | 1250.0 |
| PHOTOMER 3082* | 10.0 | 500.0 |

*Available from Henkel Corp., Ambler, PA

Weigh all four components into a 5000 ml round bottom reaction kettle. Heat mixture to about 70° C. and sparge with air. Mix all components until a homogenous admixture is formed.

EXAMPLE 2

Add 17.58 parts by weight bisphenol-A diglycidyl ether epoxy resin (DER-331, commercially available from DOW Chemical Co.) to the reaction vessel and heat to about 60–80° C. Then add 3.50 parts by weight lauric acid, 1.97 parts by weight Versamid 335 polyamide acrylic and 0.05 parts by weight polymerization inhibitor 4-methoxyphenol and continue heating to 85° C. Sparge mixture with air. In a separate vessel, pre-mix 6.37 parts by weight acrylic acid, 0.05 parts by weight polymerization inhibitor and 0.17 parts by weight triphenyl phosphine. Mix until clear and uniform. Heat (30° C.) may be added to melt the triphenyl phosphine. Transfer 3.13% of the batch weight of the premix to the reaction vessel. Add 0.08 parts by weight of triphenyl phosphine to the reaction vessel while observing the exotherm. When the temperature reaches about 90° C. apply cooling. After waiting about 5 minutes or until the exotherm subsides begin adding the pre-mix tho the reaction vessel at a rate such that the reaction maintains a temperature of about 95–100° C. Two hours after the premix is added, raise the temperature to 115–120° C. and react until desired final acid value is reached. When desired acid value is reached add 0.05 parts by weight 4-methoxyphenol, 0.01 parts by weight this-n-nitroso, n-phenyl hydroxylamine aluminum and 5.22 parts by weight propoxylated glycerol acrylate and mix for about 60 minutes while maintaining the temperature at about 105° C. Discontinue the air sparge and allow to cool to 90–95° C. while material deairates. After cooling add 30 parts by weight RCC 13-363 aromatic urethane xylate, 25 parts by weight RCC 13-430 acrylated polyester and 10 parts by weight PHOTOMER 3082 acrylated linseed oil and blend until uniform.

EXAMPLE 3

A flushing vehicle prepared as in Example 2 is contacted with a presscake containing water in a high-shear mixer. After mixing the flushing vehicle and the presscake the water driven out of the presscake is removed by decanting until only a small percentage of water remains. The last traces of water are removed by applying a subatmospheric pressure and heat to the flushed presscake.

While the above descriptions contain many specifics, these specifics should not be construed as limitations on the scope of the invention, but merely as exemplifications of preferred embodiments thereof. Those skilled in the art will envision many other possible variations that are within the scope and spirit of the invention as defined by the claims appended hereto.

What is claimed is:

1. A flushed pigment composition comprising a pigment and a flushing vehicle, the flushed pigment being substantially free of water, the flushing vehicle comprising a substantially homogenous admixture of:
   a) two or more radiation-curable acrylated resins selected from the group consisting of acrylated epoxies, acrylated urethanes and acrylated polyesters; and
   b) a rheology modifying resin copolymerizable with radiation-curable acrylate resin when subjected to radiation.

2. The composition of claim 1 wherein at least one of the two or more radiation-curable acrylated resins is an acrylated epoxy oligomer.

3. The composition of claim 1 wherein at least one of the two or more radiation-curable acrylated resins is an acrylated aromatic urethane oligomer.

4. The composition of claim 1 wherein at least one of the two or more radiation-curable acrylated resins is an acrylated polyester based on a modified fatty acid.

5. The composition of claim 1 wherein the two or more radiation-curable acrylated resins are a substantially homogenous admixture of acrylated epoxy oligomer, acrylated aromatic urethane oligomer and acrylated polyester based on modified fatty acids.

6. The composition of claim 2 wherein the acrylated epoxy oligomer is selected from the group consisting of acrylated epoxy soya oil, acrylated epoxy linseed oil and bisphenol A epoxy diacrylates.

7. The composition of claim 3 wherein the acrylated aromatic urethane oligomer is selected from the group consisting of aromatic urethane hexa acrylates and aromatic urethane diacrylates.

8. The composition of claim 1 wherein the rheology modifying resin is the reaction product of (i) an epoxy component, (ii) an ethylenically unsaturated carboxylic acid or reactive derivative thereof and (iii) a fatty acid or reactive derivative thereof, said components (i), (ii) and (iii) being reacted in the presence of a polyamide based on a polymerized fatty acid.

9. The composition of claim 8 wherein the ethylenically unsaturated carboxylic acid is selected from the group consisting of acrylic acid, methacrylic acid, adducts of hydroxyalkyl acrylates, adducts of hydroxyalkyl methacrylates and anhydrides of dicarboxylic acids.

10. The composition of claim 8 wherein the epoxy component is selected from the group consisting of diglycidyl ethers.

11. The composition of claim 10 wherein the epoxide component is a diglycidyl ether of a member selected from the group consisting of ethylene glycol, 1,2-propylene glycol, 1,3-propylene glycol, 1,4-butanediol, 1,6-hexanediol, neopentyl glycol, glycerine, polytetrahydrofuran, polyethylene glycols, polypropylene glycols, dihydric phenol and bisphenol A.

12. The composition of claim 8 wherein the fatty acid is selected from the group consisting of saturated aliphatic monocarboxylic acids containing 8 to 24 carbon atoms, unsaturated aliphatic monocarboxylic acids containing 8 to 24 carbon atoms, saturated hydroxycarboxylic acids containing 8 to 24 carbon atoms, and unsaturated hydroxycarboxylic acids containing 8 to 24 carbon atoms.

13. The composition of claim 8 wherein the fatty acid is selected from the group consisting of caprylic acid, 2-ethylhexanoic acid, capric acid, lauric acid, myristic acid, palmitic acid, palargonic acid, palmitoleic acid, stearic acid, isostearic acid, oleic acid, elaidic acid, petroselic acid, linoleic acid, linolenic acid, elaeostearic acid, conjuene fatty acid, ricinoleic acid, arachic acid, gadoleic acid, behenic acid, erucic acid and brassidic acid.

14. The composition of claim 8 wherein the epoxide component is diglycidyl ether of bisphenol A, the ethylenically unsaturated carboxylic acid is acrylic acid and the fatty acid is lauric acid.

15. The composition of claim 1 further comprising a photoinitiator.

16. A composition comprising a substantially homogenous admixture of:
   a) two or more radiation-curable acrylated resins selected from the group consisting of acrylated epoxies, acrylated urethanes and acrylated polyesters; and
   b) a rheology modifying resin copolymerizable with radiation curable acrylate resin when subjected to radiation.

17. A lithographic ink comprising a Water insoluble pigment and the composition of claim 16.

18. The composition of claim 17 containing from about 20 to about 70% by weight ink pigment and from about 30 to about 80% by weight flushing agent.

19. A method for removing water from a presscake containing pigment and water the method comprising:
   providing a composition including
      (i) a radiation curable acrylated resin selected from the group consisting of acrylated epoxies, acrylated urethanes and acrylated polyesters; and
      (ii) a rheology modifying resin, contacting the composition with the presscake to provide a mixture; and separating water from the mixture.

20. The method of claim 19 wherein the step of separating water from the mixture comprises decanting the water.

21. The method of claim 20 wherein the step of separating water from the mixture further comprises applying subatmospheric pressure to the mixture.

22. The method of claim 19 wherein the step of contacting the composition with the presscake comprises combining the composition and presscake in a high-shear mixer.

23. A method for preparing a flushing vehicle, comprising the steps of forming a reaction mixture by adding (i) an epoxy component, (ii) an ethylenically unsaturated carboxylic acid or reactive derivative thereof, (iii) a fatty acid or reactive derivative thereof and (iv) a polyamide to a reaction vessel; and
   adding to the reaction mixture two or more radiation-curable acrylated resins selected from the group comprising acrylated epoxies, acrylated urethanes and acrylated polyesters.

24. A method as in claim 23 wherein the ethylenically unsaturated carboxylic acid is selected from the group consisting of acrylic acid, methacrylic acid, adducts of hydroxyalkyl acrylates, adducts of hydroxyalkyl methacrylates and anhydrides of dicarboxylic acids.

25. A method as in claim 23 wherein the epoxy component is selected from the group consisting of diglycidyl ethers.

26. A method as in claim 23 wherein the epoxy component is a diglycidyl ether of a member selected from the group consisting of ethylene glycol, 1,2-propylene glycol, 1,3-propylene glycol, 1,4-butanediol, 1,6-hexanediol, neopentyl glycol, glycerine, polytetrahydrofuran, polyethylene glycols, polypropylene glycols, dihydric phenol and bisphenol A.

27. A method as in claim 23 wherein the fatty acid is selected from the group consisting of saturated aliphatic monocarboxylic acids containing 8 to 24 carbon atoms, unsaturated aliphatic monocarboxylic acids containing 8 to 24 carbon atoms, saturated hydroxycarboxylic acids containing 8 to 24 carbon atoms, and unsaturated hydroxycarboxylic acids containing 8 to 24 carbon atoms.

28. A method as in claim 23 wherein the fatty acid is selected from the group consisting of caprylic acid, 2-ethylhexanoic acid, capric acid, lauric acid, myristic acid, palmitic acid, palargonic acid, palmitoleic acid, stearic acid, isostearic acid, oleic acid, elaidic acid, petroselic acid, linoleic acid, linolenic acid, elaeostearic acid, conjuene fatty acid, ricinoleic acid, arachic acid, gadoleic acid, behenic acid, erucic acid and brassidic acid.

29. A method as in claim 23 wherein the epoxy component is diglycidyl ether of Bisphenol A, the ethylenically unsaturated carboxylic acid is acrylic acid and the fatty acid is lauric acid.

* * * * *